(12) United States Patent
Mason et al.

(10) Patent No.: US 12,240,361 B2
(45) Date of Patent: Mar. 4, 2025

(54) INFANT CAR SEAT

(71) Applicant: WONDERLAND SWITZERLAND AG, Steinhausen (CH)

(72) Inventors: Kyle S. Mason, Lititz, PA (US); Colin F. Eggert-Crowe, King of Prussia, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/348,575

(22) Filed: Jul. 7, 2023

(65) Prior Publication Data

US 2024/0001819 A1    Jan. 4, 2024

Related U.S. Application Data (63) Continuation of application No. 16/868,636, filed on May 7, 2020, now Pat. No. 11,718,207.
(Continued)

(51) Int. Cl.
*B60N 2/28*        (2006.01)
*A47D 1/00*        (2006.01)

(52) U.S. Cl.
CPC ......... *B60N 2/2821* (2013.01); *B60N 2/2842* (2013.01); *A47D 1/004* (2013.01);
(Continued)

(58) Field of Classification Search
CPC ...... A47D 1/004; A47D 1/006; B60N 2/2875; B60N 2/2842
See application file for complete search history.

(56) References Cited

U.S. PATENT DOCUMENTS 4,978,166 A    12/1990    James
4,997,231 A     3/1991    Smith
(Continued)

FOREIGN PATENT DOCUMENTS

CN       201268326 Y     7/2009
CN       101861263 A    10/2010
(Continued)

OTHER PUBLICATIONS

First Chinese Office Action with english translation; CN Application No. 202010396004.1; Date mailed: Mar. 21, 2022; pp. 1-13.
(Continued)

*Primary Examiner* — Syed A Islam
(74) *Attorney, Agent, or Firm* — CANTOR COLBURN LLP (57) ABSTRACT

An infant car seat is adapted for being installed on a seat carrier. The infant car seat includes a seat shell, a latch, a release unit, and a resilient member. The seat shell is formed with a receiving space having an opening. The latch is disposed in the receiving space, and is adapted for engaging with a ledge of the seat carrier. The release unit includes an actuating member operable to drive the latch to move from a rest position, where a portion of the latch protrudes out of the opening for engaging with the ledge of the seat carrier, to a retracted position, where the latch is retracted into the receiving space. The resilient member is connected between the seat shell and the latch for biasing the latch toward the rest position.

12 Claims, 8 Drawing Sheets

Related U.S. Application Data (60) Provisional application No. 62/846,887, filed on May 13, 2019.

(52) U.S. Cl.
CPC ............ *A47D 1/006* (2013.01); *B60N 2/2851* (2013.01); *B60N 2/2875* (2013.01)

(56) References Cited

U.S. PATENT DOCUMENTS

| | | | |
|---|---|---|---|
| 5,803,535 A | 9/1998 | Cabagnero | |
| 6,027,163 A | 2/2000 | Longnecker | |
| 6,170,910 B1 | 1/2001 | Bapst | |
| 7,083,228 B1 | 8/2006 | Al Sawan | |
| 7,478,877 B2 | 1/2009 | Lhomme et al. | |
| 7,597,396 B2 * | 10/2009 | Longenecker ....... | B60N 2/2875 297/256.16 |
| 8,070,228 B2 | 12/2011 | Karremans et al. | |
| 8,474,907 B2 | 7/2013 | Weber et al. | |
| 8,678,498 B2 | 3/2014 | Heisey | |
| 8,882,191 B2 | 11/2014 | Phung et al. | |
| 8,882,196 B2 | 11/2014 | Williams et al. | |
| 9,090,181 B2 | 7/2015 | Williams et al. | |
| 9,119,483 B1 | 9/2015 | Heisey | |
| 9,346,378 B2 | 5/2016 | Zhang | |
| 9,480,343 B2 * | 11/2016 | Haut .................. | A47D 1/0081 |
| 9,758,068 B2 | 9/2017 | Taylor et al. | |
| 10,413,085 B2 | 9/2019 | Haut | |
| 10,675,548 B1 | 6/2020 | Colton | |
| 2007/0257526 A1 | 11/2007 | Hei et al. | |
| 2009/0045656 A1 | 2/2009 | Chen et al. | |
| 2010/0052373 A1 | 3/2010 | Kono et al. | |
| 2011/0074194 A1 | 3/2011 | Weber et al. | |
| 2011/0312243 A1 | 12/2011 | Schoen et al. | |
| 2012/0326474 A1 | 12/2012 | Williams et al. | |
| 2014/0021751 A1 | 1/2014 | Lang et al. | |
| 2014/0368014 A1 | 12/2014 | Haut et al. | |
| 2015/0266399 A1 | 9/2015 | Lake et al. | |
| 2016/0016602 A1 | 1/2016 | D'Anastasi | |
| 2016/0368400 A1 | 12/2016 | Taylor et al. | |
| 2017/0240072 A1 | 8/2017 | Wright | |
| 2018/0098642 A1 | 4/2018 | Williams et al. | |
| 2020/0361348 A1 | 11/2020 | Mason et al. | |
| 2022/0111775 A1 | 4/2022 | Xiao | |
| 2023/0001830 A1 | 1/2023 | Mason et al. | |
| 2024/0025310 A1 | 1/2024 | Mason et al. | |

FOREIGN PATENT DOCUMENTS

| | | |
|---|---|---|
| CN | 102336153 A | 2/2012 |
| CN | 102336209 A | 2/2012 |
| CN | 102848945 A | 1/2013 |
| CN | 106256598 A | 12/2016 |
| CN | 107618406 A | 1/2018 |
| CN | 108621882 A | 10/2018 |
| EP | 1591307 B1 | 6/2014 |
| EP | 2923917 A1 | 9/2015 |
| GB | 2470801 A | 12/2010 |
| GB | 2482062 B | 1/2012 |
| GB | 2491959 A | 12/2012 |

OTHER PUBLICATIONS

Written Opinion for International Application No. PCT/EP2020/063370; International Filing Date: May 13, 2020; Date of Mailing: Oct. 8, 2020; 7 pages.

First Chinese Office Action; Chinese Application No. 202010396350.X; Date: Feb. 18, 2022; 16 pages.

International Search Report for International Application No. PCT/EP2020/063370; International Filing Date: May 13, 2020; Date of Mailing: Oct. 8, 2020; 3 pages.

U.S. Appl. No. 19/868,636, filed May 7, 2020; Non-Final Office Action mailed Sep. 24, 2021; 12 pages.

U.S. Final Office Action; U.S. Appl. No. 16/868,636, filed May 7, 2020; Mailing Date: Mar. 22, 2022; 13 pages.

U.S. Non-Final Office Action; U.S. Appl. No. 16/868,640, filed May 7, 2020; Mailing Date: Mar. 3, 2022; 14 pages.

* cited by examiner

INFANT CAR SEAT

CROSS-REFERENCE TO RELATED APPLICATIONS

This application is a continuation of U.S. application Ser. No. 16/868,636 filed on May 7, 2020, which claims the benefit of U.S. Provisional Application No. 62/846,887, filed on May 13, 2019, both of which are incorporated by reference in their entirety herein.

FIELD

The disclosure relates to an infant car seat, more particularly to an infant car seat for installing on a seat carrier.

BACKGROUND

Infant car seats are used to transport infants. They are used in motor vehicles, on strollers and carrier by hand. A common feature of a conventional infant car seat is the ability to connect to a seat carrier, e.g. a stroller. The conventional infant car seat is coupled with a coupling structure on the stroller with a spring loaded plunger.

Because of the small size of the plunger, the coupling structure of the stroller for a conventional infant car seat has a horizontal wall to prevent vertical motion of the conventional infant car seat relative to the stroller, and two vertical walls to prevent rotational motion of the conventional infant car seat relative to the stroller.

The plunger of the conventional infant car seat also only allows installation of the conventional infant car seat onto the stroller in one orientation. As such, the conventional infant car seat would need to have two plungers in order to be installable on the stroller in two orientations.

SUMMARY

Therefore, the object of the disclosure is to provide an infant car seat that has a novel carrier-connecting mechanism.

According to the disclosure, an infant car seat is adapted for being installed on a seat carrier. The infant car seat includes a seat shell, a latch, a release unit, and a resilient member. The seat shell is formed with a receiving space having an opening. The latch is disposed in the receiving space, and adapted for engaging with a ledge of the seat carrier. The release unit includes an actuating member operable to drive the latch to move from a rest position, where a portion of the latch protrudes out of the opening for engaging with the ledge of the seat carrier, to a retracted position, where the latch is retracted into the receiving space. The resilient member is connected between the seat shell and the latch for biasing the latch toward the rest position.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present invention is described in greater detail, it should be noted that where considered appropriate, reference numerals or terminal portions of reference numerals have been repeated among the figures to indicate corresponding or analogous elements, which may optionally have similar characteristics.

Figure 1:
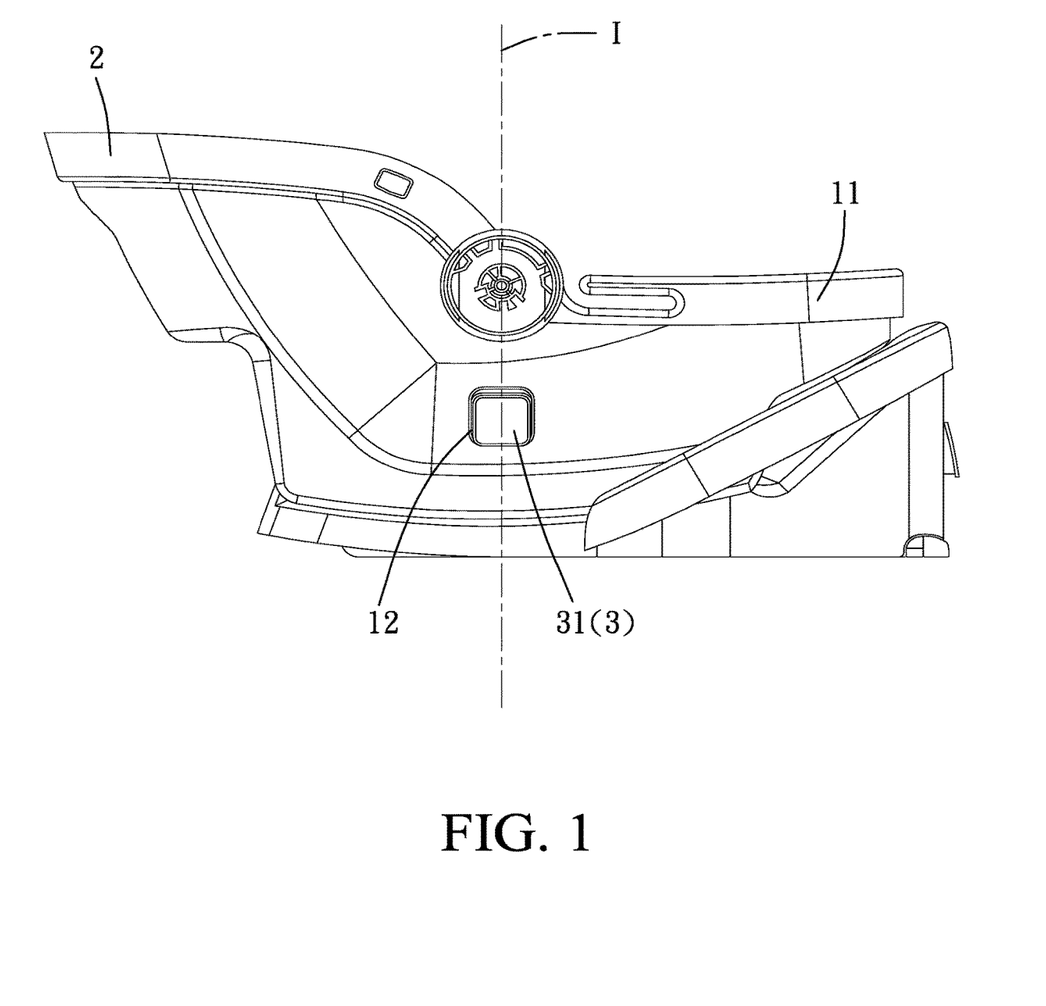
FIG. 1 is a side view of a first embodiment of an infant car seat according to the disclosure.
Figure 2:
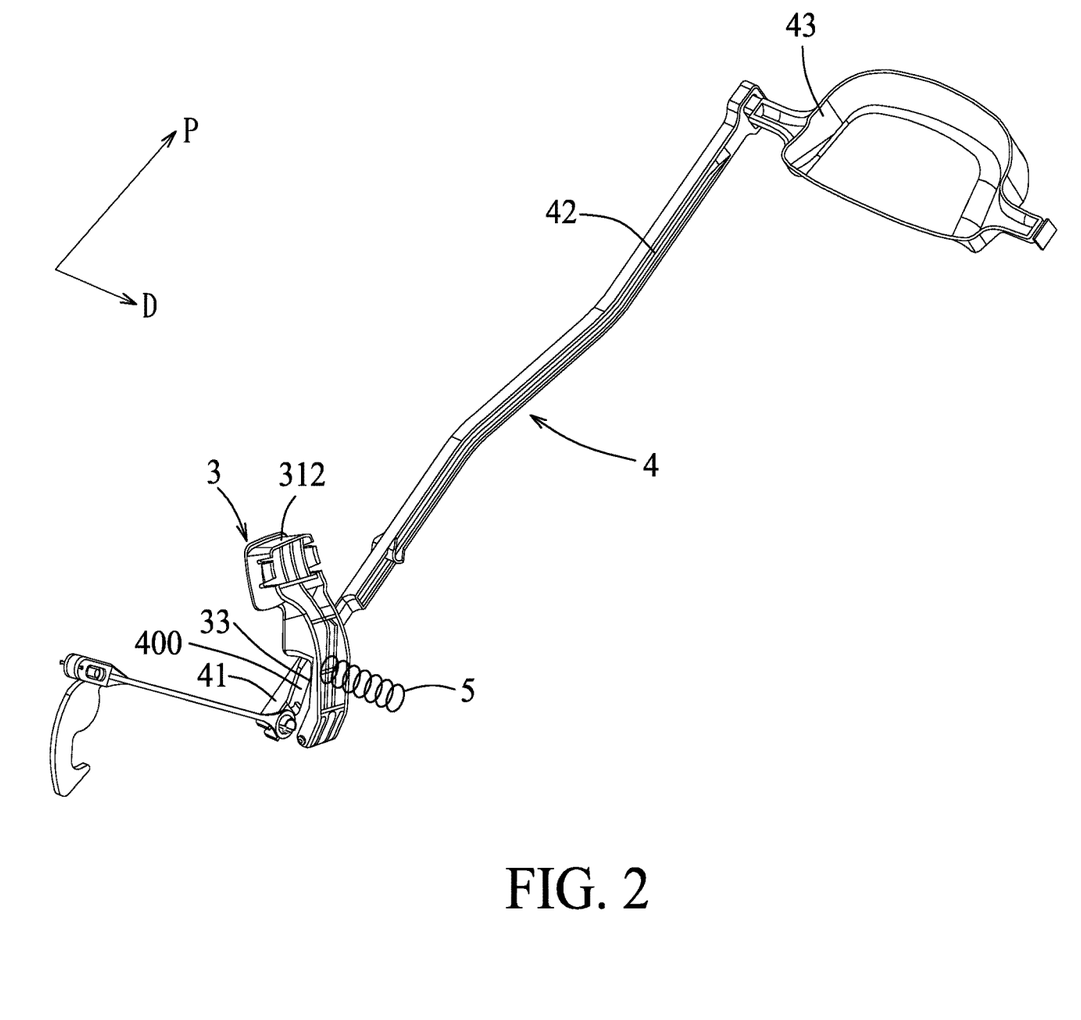
FIG. 2 is a perspective view of a latch, a release unit and a resilient member of the first embodiment.
Figure 3:
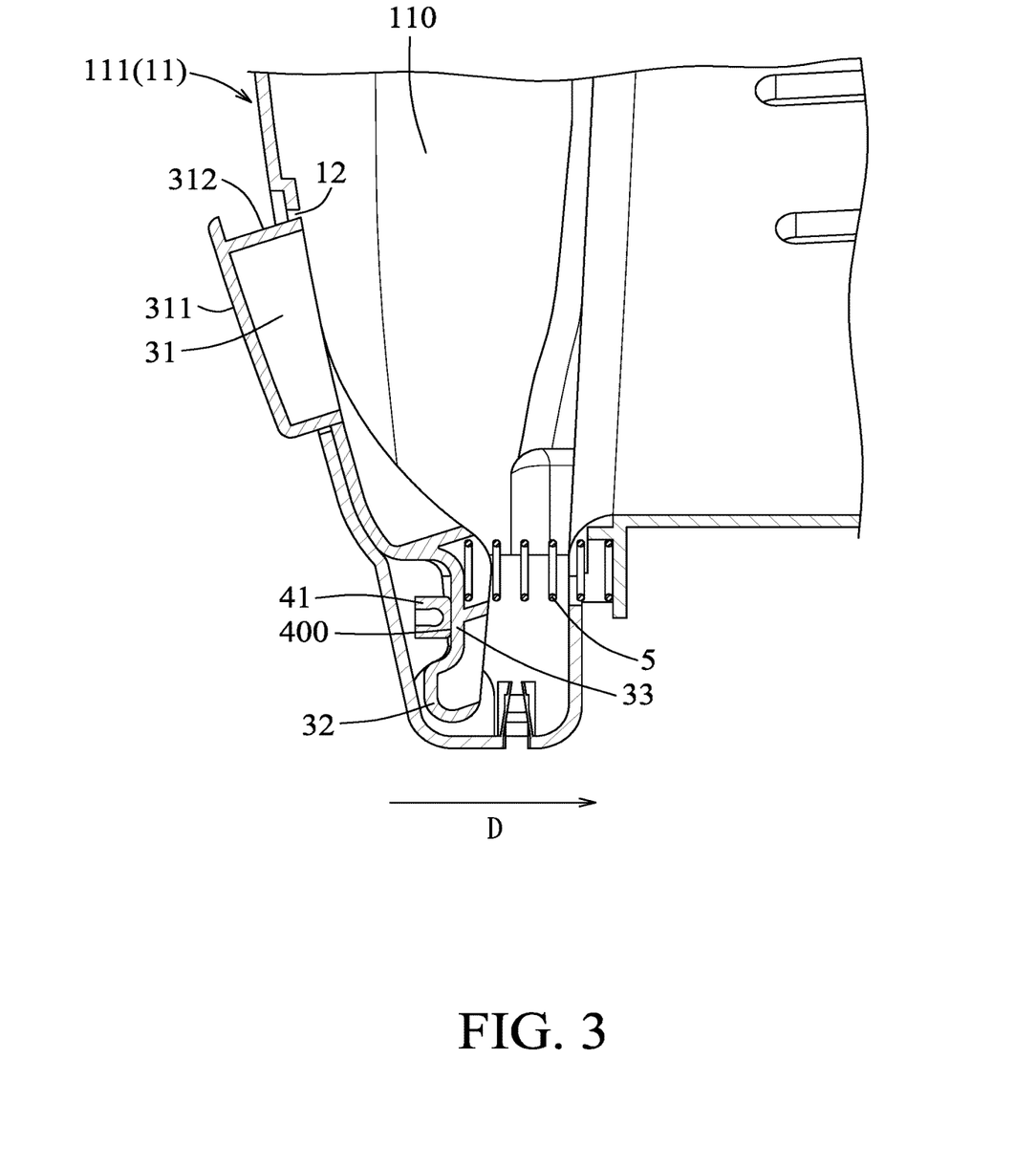
FIG. 3 is a fragmentary sectional view of the first embodiment, illustrating the latch at a rest position.

Referring to FIGS. 1 to 3, a first embodiment of an infant car seat according to the disclosure is adapted for being installed on a seat carrier (not shown). The infant car seat includes a seat shell 11, a handle 2, a latch 3, and a release unit 4. The seat shell 11 is formed with a receiving space 110 that has an opening 12. Specifically, the seat shell 11 has a side wall 111 formed with the opening 12. The handle 2 is pivotally connected to said seat shell 11.

The latch 3 is disposed in the receiving space 110 and includes an engaging end portion 31 having an outer surface 311 and a latching surface 312, a pivot end portion 32 pivoted to the seat shell 11, and a connecting portion 33 interconnecting the engaging end portion 31 and the pivot end portion 32. In this embodiment, the outer surface 311 and the latching surface 312 of the engaging end portion 31 are substantially perpendicular to each other.

Figure 4:
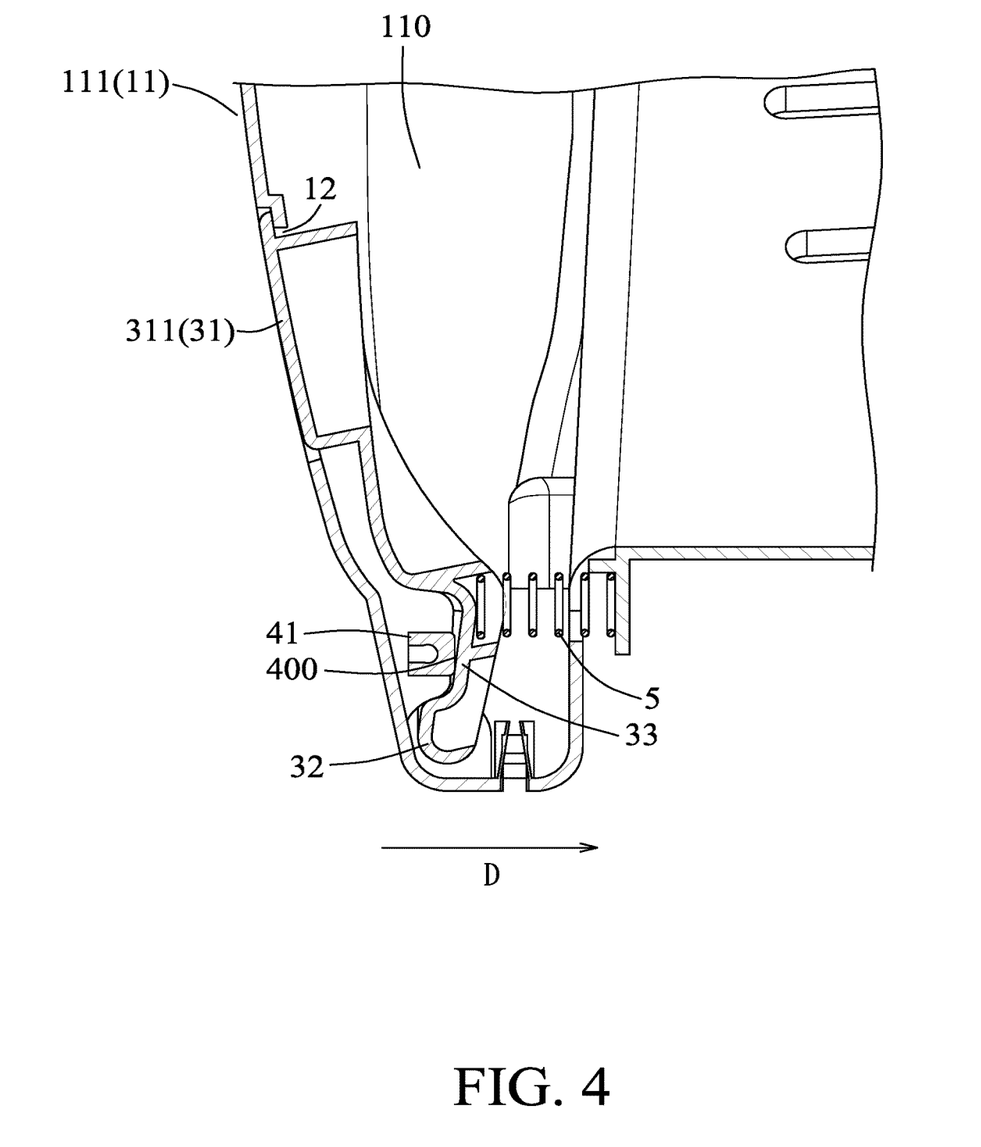
FIG. 4 is a view similar to FIG. 3, illustrating the latch at a retracted position.

Referring to FIGS. 3 and 4, the latch 3 is movable between a rest position (FIG. 3), where the engaging end portion 31 protrudes out of the opening 12 for engaging with a ledge (not shown) of the seat carrier, and a retracted position (FIG. 4), where the latch 3 is retracted into the receiving space 110. The outer surface 311 of the engaging end portion 31 of the latch 3 is flush with an outer surface of the side wall 111 of the seat shell 11 when the latch 3 is at the retracted position. The latching surface 312 is adapted for coupling with the ledge of the seat carrier when the latch 3 is at the rest position. The resilient member 5 is connected between the seat shell 11 and the latch 3 for biasing the latch 3 toward the rest position.

In this embodiment, the latch 3 pivots relative to the seat shell 11 when moving between the rest position and the retracted position, but in other embodiments, the pivot end portion 32 may be omitted and the latch 3 may move linearly relative to the seat shell 11 between the rest position and the retracted position.

In this embodiment, the latching surface 312 of the engaging end portion 31 is elongated along a front-rear direction. The latching surface 312 of this disclosure has a larger surface relative to that of a conventional infant car seat, which allows the ledge of the seat carrier for the infant car seat of the disclosure to have only one horizontal wall while still engaging stably with the latch 3 and limiting rotational movement of the infant car seat of the disclosure. The ledge of the seat carrier for the infant car seat of the disclosure therefore has a simplified structure when compared with the coupling structure of the stroller for the conventional infant car seat.

Referring back to FIG. 1, in this embodiment, the opening 12 of the receiving space 110, and thus the engaging end portion 31 of the latch 3, is disposed substantially center of the seat shell 11 along the front-rear direction, and has a structure symmetrical with respect to an imaginary vertical plane (I) extending along a left-right direction which is perpendicular to the front-rear direction. This allows the infant car seat to be installed on the seat carrier in two symmetrical orientations using the same latch 3.

Referring back to FIGS. 2 and 3, the release unit 4 includes an actuating member 41, a connecting member 42 having an end connected to the actuating member 41, and a release handle 43 connected to another end of the connecting member 42 opposite to the actuating member 41 and operable to move the connecting member 42 in a driving direction (P).

The actuating member 41 is operable to drive the latch 3 to move from the rest position to the retracted position. In this embodiment, the actuating member 41 is connected between the latch 3 and the side wall 111 of the seat shell 11, and is movable in the driving direction (IP) to drive the latch 3 to move in a transverse direction (D) which is perpendicular to the driving direction (P) from the rest position to the retracted position.

One of the actuating member 41 and the latch 3 has a contact surface 400 being in sliding contact with the other one of the actuating member 41 and the latch 3 and being inclined relative to the driving direction (P). In this embodiment, the actuating member 41 is wedge-shaped and has the contact surface 400 which is in sliding contact with the connecting portion 33 of the latch 3, and a width of the actuating member 41 in the transverse direction (D) decreases in the driving direction (P).

Figure 5:
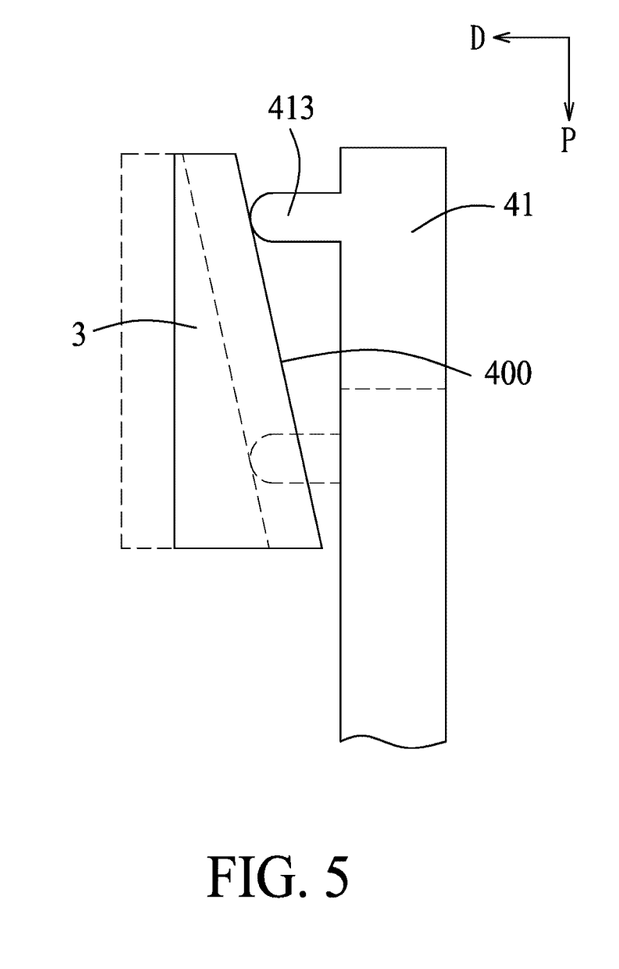
FIG. 5 is a fragmentary schematic view of the latch and an actuating member of the release unit of a variation of the first embodiment.
Figure 6:
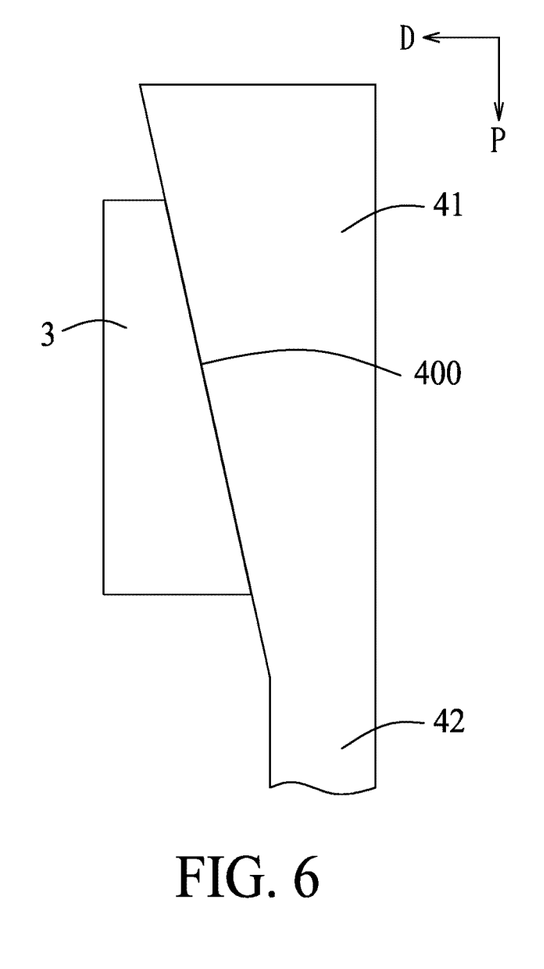
FIG. 6 is a fragmentary schematic view of the latch and the actuating member of another variation of the first embodiment.

Referring to FIGS. 5 and 6, in certain variations of the first embodiment, the connecting portion 33 of the latch 3 is formed with the contact surface 400 and has a wedge-shaped cross-section, and a width of the connecting portion 33 of the latch 3 in the transverse direction (D) increases in the driving direction (P). In these variations, the actuating member 41 has a width in the transverse direction (D) that is larger at an end distal to the connecting portion 42 and that is smaller at an end proximal to the connecting portion 42. For example, the actuating member 41 may be wedge-shaped (see FIG. 6) (i.e., the width of the actuating member 41 in the transverse direction (D) gradually decreases in the driving direction (P)), or the actuating member 41 may be formed with a protruding portion 413 that protrudes toward the latch 3 from a portion of the actuating member 41 distal to the connecting member 42 (see FIG. 5).

Figure 7:
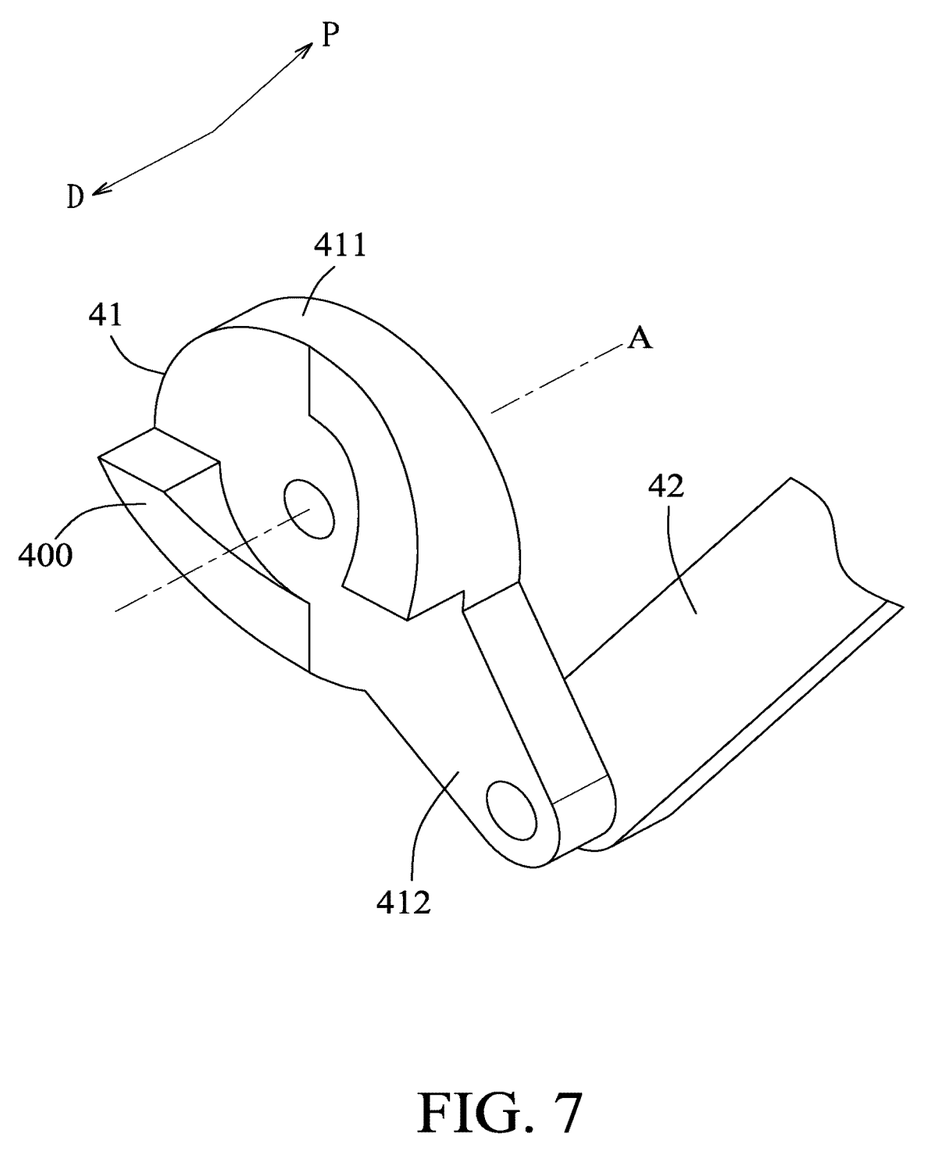
FIG. 7 is a fragmentary perspective view of the actuating member and a connecting member of the release unit of a second embodiment of an infant car seat according to the disclosure.
Figure 8:
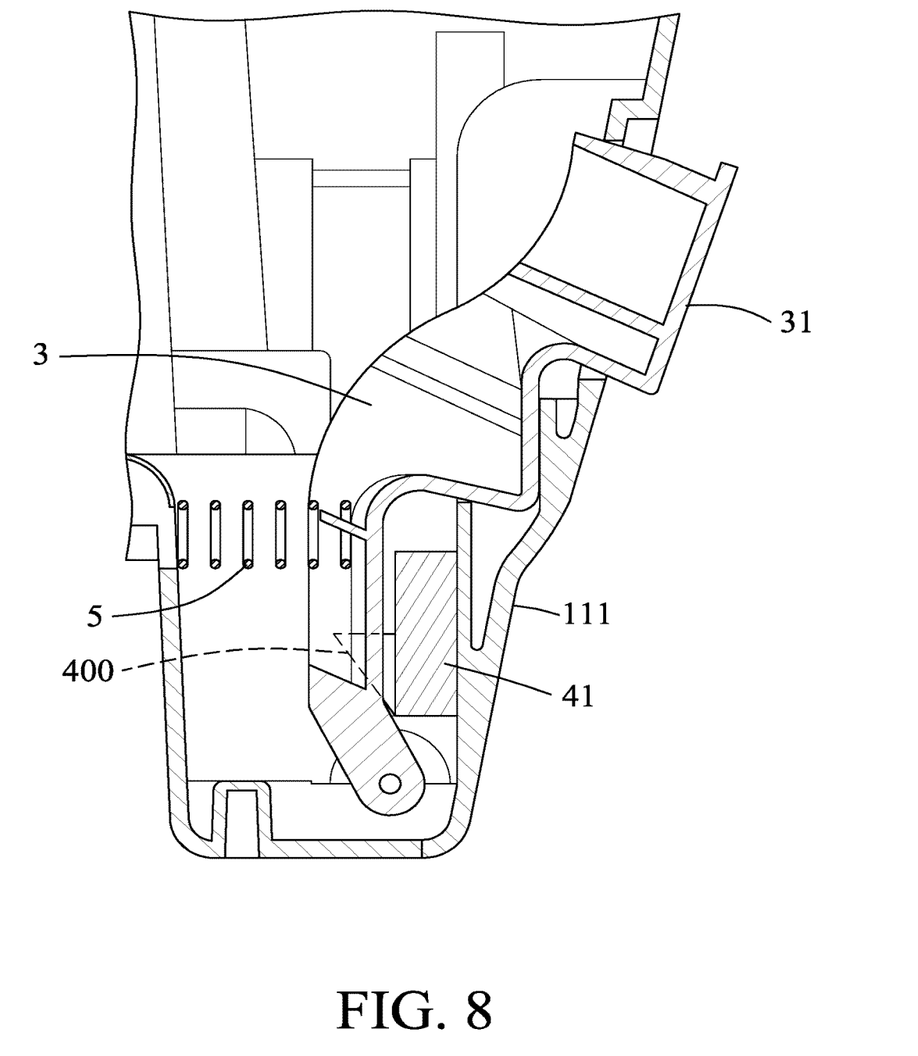
FIG. 8 is a fragmentary sectional view of the second embodiment.

Referring to FIGS. 7 and 8, a second embodiment of an infant car seat according to the disclosure is similar to the first embodiment, but differs in the structure of the release unit 4. In the second embodiment, the actuating member 41 has a main body 411 connected rotatably between the latch 3 and the side wall 111 of the seat shell 11 and being substantially circular, and an actuated portion 412 extending radially from the main body 411. The connecting member 42 is connected pivotally to actuated portion 412 of the actuating member 41 such that movement of the connecting member 42 in the driving direction (P) drives the actuating member 41 to rotate about an axis (A) extending in the transverse direction (D). The contact surface 400 of the actuating member 41 extends helically about the axis (A) and is in sliding contact with the latch 3 such that rotation of the actuating member 41 about the axis (A) drives the latch 3 to move from the rest position to the retracted position.

Figure 9:
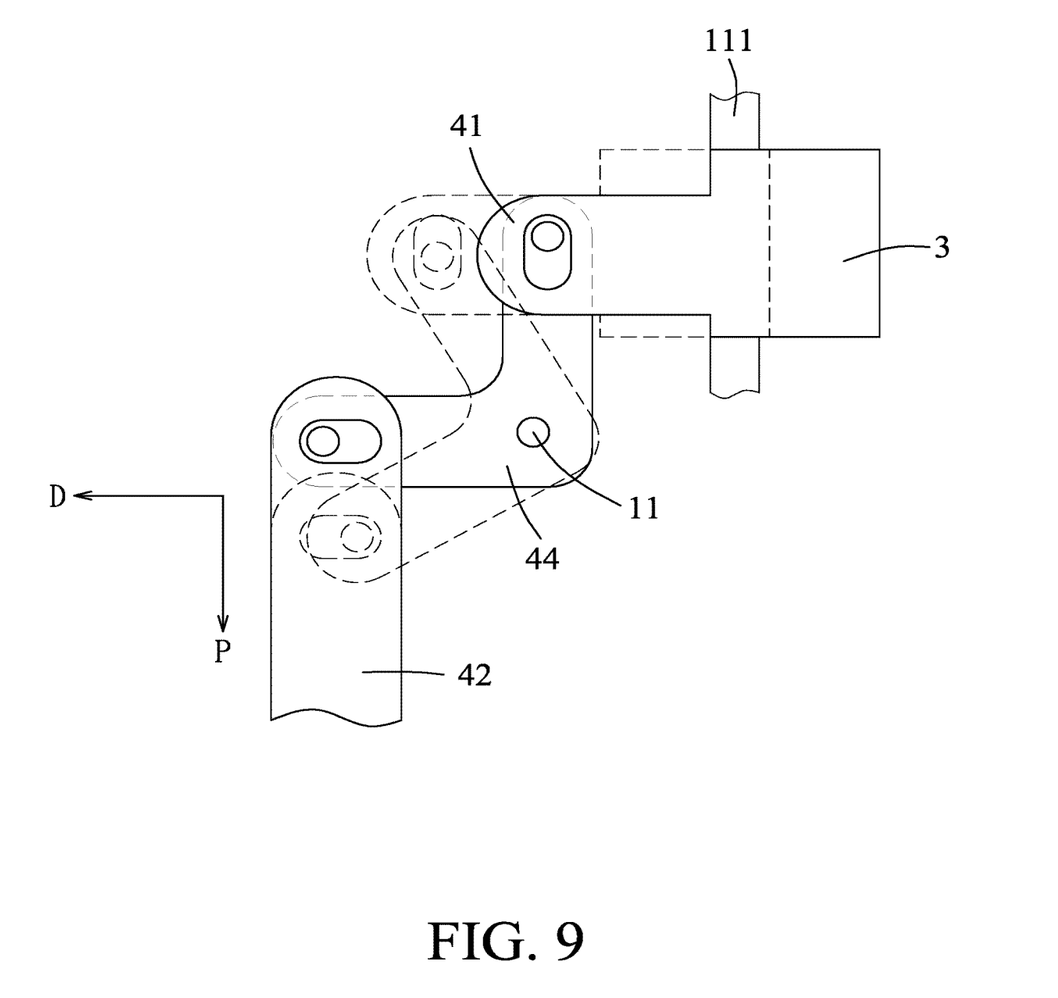
FIG. 9 is a fragmentary schematic view of the latch and the release unit of a third embodiment of an infant car seat according to the disclosure.

Referring to FIG. 9, a third embodiment of an infant car seat according to the disclosure is similar to the first embodiment, but differs in the position and the structure of the release unit 4. In the third embodiment, the actuating member 41 is co-movably connected to the latch 3 and is disposed at a side of the latch 3 opposite to the side wall 111. The release unit 4 further includes an L-shaped rotating link 44 rotatably mounted to the seat shell 11 and having opposite ends respectively and pivotally connected to the actuating member 41 and the connecting member 42. Movement of the connecting member 42 in the driving direction (P) rotates the rotating link 44, thereby driving the latch 3 to move, via the actuating member 41, in the transverse direction (D) from the rest position to the retracted position.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An infant car seat adapted for being installed on a seat carrier, the infant car seat comprising:
    a seat shell;
    a latch operable to selectively engage the seat carrier, the latch being movable between rest position, in which a portion of latch protrudes from the seat shell and a retracted position in which the latch is retracted within the seat shell;
    a resilient member operable to bias the latch toward the rest position, and
    a release unit including:
        an actuating member rotatable about an axis relative to the latch to drive the latch to from the rest position to the retracted position; and
        a connecting member pivotally connected to the actuating member, wherein the actuating member is rotatable about the axis in response to movement of the connecting member;

wherein the latch is rotatable about another axis, the another axis being arranged at a non-parallel angle relative to the axis of the actuating member.

2. The infant car seat as claimed in claim 1, wherein the seat shell has a side wall including an opening and the latch protrudes through the opening in the rest position.

3. The infant car seat as claimed in claim 2, wherein the actuating member is positioned between the latch and the side wall, the actuating member having a contact surface rotatable into sliding contact with the latch.

4. The infant car seat as claimed in claim 3, wherein the contact surface of the actuating member extends helically about the axis.

5. The infant car seat as claimed in claim 3, wherein a distance between the contact surface and the actuating member varies about the axis.

6. The infant car seat as claimed in claim 3, wherein movement of the actuating member in a driving direction moves the latch in a transverse direction between the rest position and the retracted position.

7. The infant car seat as claimed in claim 3, wherein the transverse direction is perpendicular to the driving direction.

8. The infant car seat as claimed in claim 1, wherein the release unit is movable in a driving direction to drive the actuating member to rotate about an axis extending in a transverse direction.

9. The infant car seat as claimed in claim 1, wherein the release unit further includes:
a release handle that is connected to another end of the connecting member opposite to the actuating member and that is operable to move the connecting member in a driving direction.

10. The infant car seat as claimed in claim 1, wherein the latch has a latching surface that is adapted for coupling with a ledge of the seat carrier when the latch is at the rest position.

11. The infant car seat as claimed in claim 1, wherein the latch includes:
an engaging end portion,
a pivot end portion pivotably arranged within the seat shell, and
a connecting portion interconnecting the engaging end portion and the pivot end portion;
the actuating member is in sliding contact with the connecting portion of the latch.

12. An infant car seat adapted for being installed on a seat carrier, the infant car seat comprising:
a seat shell;
a latch operable to selectively engage the seat carrier, the latch being movable between rest position, in which a portion of latch protrudes from the seat shell and a retracted position in which the latch is retracted within the seat shell;
a resilient member operable to bias the latch toward the rest position; and
a release unit including an actuating member rotatable about an axis to drive the latch to from the rest position to the retracted position;
wherein the actuating member has a contact surface rotatable into sliding contact with the latch, and the contact surface of the actuating member extends helically about the axis.

* * * * *